(12) United States Patent
Sørensen

(10) Patent No.: US 12,527,459 B2
(45) Date of Patent: Jan. 20, 2026

(54) ENDOSCOPE

(71) Applicant: AMBU A/S, Ballerup (DK)

(72) Inventor: Morten Sørensen, Ballerup (DK)

(73) Assignee: AMBU A/S, Ballerup (DK)

( * ) Notice: Subject to any disclaimer, the term of this patent is extended or adjusted under 35 U.S.C. 154(b) by 339 days.

(21) Appl. No.: 18/268,814

(22) PCT Filed: Dec. 17, 2021

(86) PCT No.: PCT/EP2021/086413
§ 371 (c)(1),
(2) Date: Jun. 21, 2023

(87) PCT Pub. No.: WO2022/136149
PCT Pub. Date: Jun. 30, 2022

(65) Prior Publication Data
US 2024/0032777 A1   Feb. 1, 2024

(30) Foreign Application Priority Data
Dec. 22, 2020   (EP) .................................... 20216289

(51) Int. Cl.
*A61B 1/00* (2006.01)
*A61B 1/05* (2006.01)

(52) U.S. Cl.
CPC ...... *A61B 1/00096* (2013.01); *A61B 1/00103* (2013.01); *A61B 1/0011* (2013.01); *A61B 1/051* (2013.01)

(58) Field of Classification Search
CPC ............ A61B 1/00096; A61B 1/00103; A61B 1/0011; A61B 1/051; A61B 1/05; G02B 23/2423; G02B 23/2407; G02B 23/243
See application file for complete search history.

(56) References Cited

U.S. PATENT DOCUMENTS

| 4,491,865 A | 1/1985 | Danna et al. |
| 8,360,965 B2 | 1/2013 | Kuchimaru et al. |
| 8,427,766 B2 | 4/2013 | Ning et al. |

(Continued)

FOREIGN PATENT DOCUMENTS

| EP | 2842477 A1 | 3/2015 |
| JP | 2012-002947 A | 1/2012 |

OTHER PUBLICATIONS

International Search Report and Written Opinion received for PCT Patent Application No. PCT/EP2021/086413, mailed on Mar. 28, 2022, 10 pages.

(Continued)

*Primary Examiner* — Timothy J Neal
(74) *Attorney, Agent, or Firm* — Faegre Drinker Biddle & Reath LLP

(57) ABSTRACT

An endoscope including an optical assembly including a two-part lens barrel and accommodating a lens stack including lenses and spacers in fixed relationship with each other to transmit incident light onto an image sensor. A first lens barrel part includes an essentially tubular body having an inwardly extending ledge adapted to engage the lens stack and being surrounded by a first circumferential wall part having a first predetermined height. The lens stack includes a first abutment surface and a second abutment surface arranged at a distance from the first abutment surface. The distance is longer than the predetermined height of the first circumferential wall part.

23 Claims, 3 Drawing Sheets

(56) References Cited

U.S. PATENT DOCUMENTS

Figure 1:
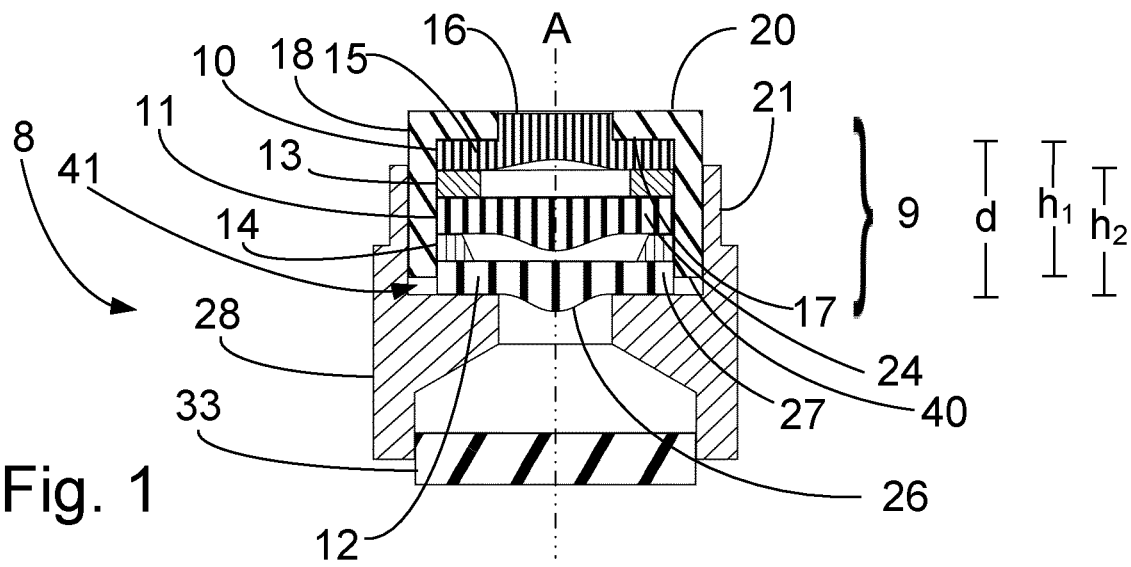

| | | |
|---|---|---|
| 2005/0179805 A1 | 8/2005 | Avron et al. |
| 2007/0249907 A1 | 10/2007 | Boulais et al. |
| 2011/0288372 A1 | 11/2011 | Petersen |
| 2015/0062316 A1 | 3/2015 | Haraguchi et al. |
| 2015/0335227 A1 | 11/2015 | Jacobsen et al. |
| 2017/0108691 A1 | 4/2017 | Kitano |
| 2019/0282070 A1 | 9/2019 | Vilhelmsen et al. |
| 2019/0282077 A1 | 9/2019 | Sørensen et al. |
| 2019/0313891 A1 | 10/2019 | Oka |
| 2020/0096723 A1 | 3/2020 | Furutake |
| 2020/0100662 A1 | 4/2020 | Jensen et al. |

OTHER PUBLICATIONS

Decision to grant in European Application No. 21824604.9, mailed Oct. 24, 2024, 2 pages.
Extended search report in European Application No. 20216289.7, mailed May 28, 2021, 7 pages.

ENDOSCOPE

CROSS REFERENCE TO RELATED APPLICATIONS

This application is a National Phase entry under 35 U.S.C. § 371 of International Application No. PCT/EP2021/086413, filed Dec. 17, 2021, which claims the benefit of and priority from European Patent Application No. EP 20216289.7, filed Dec. 22, 2020; said applications are incorporated by reference herein in their entirety.

The present disclosure relates to endoscopes, in particular to an optical assembly of an insertion endoscope and the manufacturing thereof.

Endoscopes are well known devices for visually inspecting inaccessible places such as human body cavities. Typically, as inter alia disclosed in US2020/0100662, incorporated herein by reference, the endoscope comprises an elongated insertion cord with a handle at the proximal end as seen from the operator and visual inspections means, such as a built-in camera, i.e. an optical assembly adapted to focus incident light onto an image sensor, at the distal end of the elongated insertion cord. Electrical wiring for the image sensor and other electronics such as LED lighting run along the inside of the elongated insertion cord from the handle to the tip at the distal end. In modern endoscopes the image sensor is typically an electronic image sensor allowing the captured images to be processed and displayed on a display unit to which the endoscope is, in use, connected.

U.S. Pat. No. 8,427,766 discloses an optical assembly for a disposable endoscope. It deals, however, almost exclusively with the details of the optical assembly. The optical assembly is accommodated in an image sensor insert which also accommodates the image sensor. Details of the image sensor and how it is accommodated are not given. The lenses and spacers are arranged in a single lens barrel and may be secured there by means of subsequent deformation of the lens barrel which may potentially induce misalignment. Moreover, being separate from the imaging sensor it necessitates further elements such as the image sensor insert, where further misalignment could be introduced.

JP2012002947 discloses a lens barrel adapted for stability and durability in severe conditions, such as high and low climatic temperatures and rapid temperature changes, thermal shock. It is therefore made of ceramic in combination with glass lenses. Only the barrel itself is dealt with. Details of the apparatus where it may be implemented and how, e.g. relation to an image sensor, are not given.

Based on this background it is the object of the present disclosure to provide an endoscope with a new and improved optical assembly that renders itself for simple manufacturing and facilitates the easy assembly of the endoscope, and so keeps the costs down to allow the use as a disposable endoscope.

According to a first aspect of the disclosure this object is achieved by an endoscope comprising a handle at the proximal end, an insertion cord connected to the handle, and a tip part at the distal end of the insertion cord, said tip part comprising an optical assembly accommodating a lens stack, said lens stack comprising a number of lenses and a number of spacers in fixed relationship with each other inner through passage with an inwardly extending ledge adapted to engage said lens stack and being surrounded by a first circumferential wall part having a circumference adapted to receive and support said lens stack and having a first predetermined height above said inwardly extending ledge in said axial direction, and said second lens barrel part comprising a inner through passage adapted to engage said lens stack and being surrounded by an second circumferential wall part having a circumference adapted to receive said first circumferential wall part and having a second predetermined height above said inwardly extending ledge in said axial direction, wherein said distance is longer than said predetermined height of said first circumferential wall part so that each of said inwardly extending ledges abut one of either first or second abutment surfaces, and wherein an image sensor is accommodated at least partially in said second lens barrel part.

By providing a two-part lens barrel in this way it becomes possible to easily align, assemble, and secure the lenses and the interposed spacers in a desired mutual relation ensuring good imaging properties of the optical assembly. In particular, having the inner surface of the second lens barrel part adapted to receive and accommodate at least partially said outer circumferential surface of said first lens barrel part allow these two parts to mutually align, and hence the ledge of the second lens barrel part to press equally on the lens stack on the element thereof that it abuts, thus also ensuring alignment of the lenses and spacers of the lens stack. A lens stack with an aligned image sensor may thus be provided, thereby obviating the need of subsequent alignment of the two parts during the assembly of the endoscope. Furthermore the overall alignment is facilitated as it allows the second lens barrel part, already aligned with the first lens barrel part and the lens stack to also be aligned with the image sensor.

According to an embodiment of the first aspect of the disclosure said first and second parts are secured in mutual engagement, in particular by means of an adhesive. Because the adhesive may be applied from the exterior of the optical assembly to the outer surface of the first lens barrel part where it meets the second lens barrel part, the adhesive is kept far away from the lenses of the lens stack with no risk of contaminating the surfaces thereof and deteriorating the optical properties of the optical assembly. Even if by capillary effect or the like the glue enters into any gap between the first and the second lens barrel parts, this is far away from the lenses and involves no risk of contaminating them.

According to an embodiment of the first aspect of the disclosure, said first circumferential wall part comprises a smooth external surface matching a smooth internal surface of said second circumferential wall part. Matching smooth inner and outer surfaces allows easy insertion of the first lens barrel part into the second lens barrel part during assembly, while keeping the manufacturing of the parts by e.g. injection moulding simple.

According to an embodiment of the first aspect of the disclosure, the first lens barrel part is made from a plastic material. Plastic materials are low cost and thus suitable for disposable endoscopes. Moreover, manufacturing of parts in plastic by e.g. injection moulding is as also cost efficient and contributes to keeping the costs down.

According to an embodiment of the first aspect of the disclosure, the first lens barrel part is made from an opaque material. Using an opaque material will allow blocking and/or absorption of undesired light, e.g. stray light that could reach the image sensor and disturb the captured image.

According to an embodiment of the first aspect of the disclosure, the second lens barrel part is made of a plastic material. Plastic materials are low cost and thus suitable for disposable endoscopes. Moreover, manufacturing of parts in plastic by e.g. injection moulding is as also cost efficient and contributes to keeping the costs down.

According to an embodiment of the first aspect of the disclosure, one, more or all of the lenses are made from a plastic material. Along the lines of the above plastic is also suitable for as many lenses as possible, but it can be envisaged that certain lenses may require material with optical properties not fulfilled by available plastic materials.

According to an embodiment of the first aspect of the disclosure, the lens is integral with the first lens barrel part. This ensures the correct alignment of in particular the optical axis of the first lens element of the stack.

Furthermore, this is advantageous in the manufacturing because it allows for the further preferred embodiment, where the lens and the first lens barrel part are integrally formed in a two-stage two-component injection moulding process.

According to a second aspect of the disclosure the object is achieved by a system comprising a display unit and an endoscope according to the first aspect of the disclosure.

Figure 2:
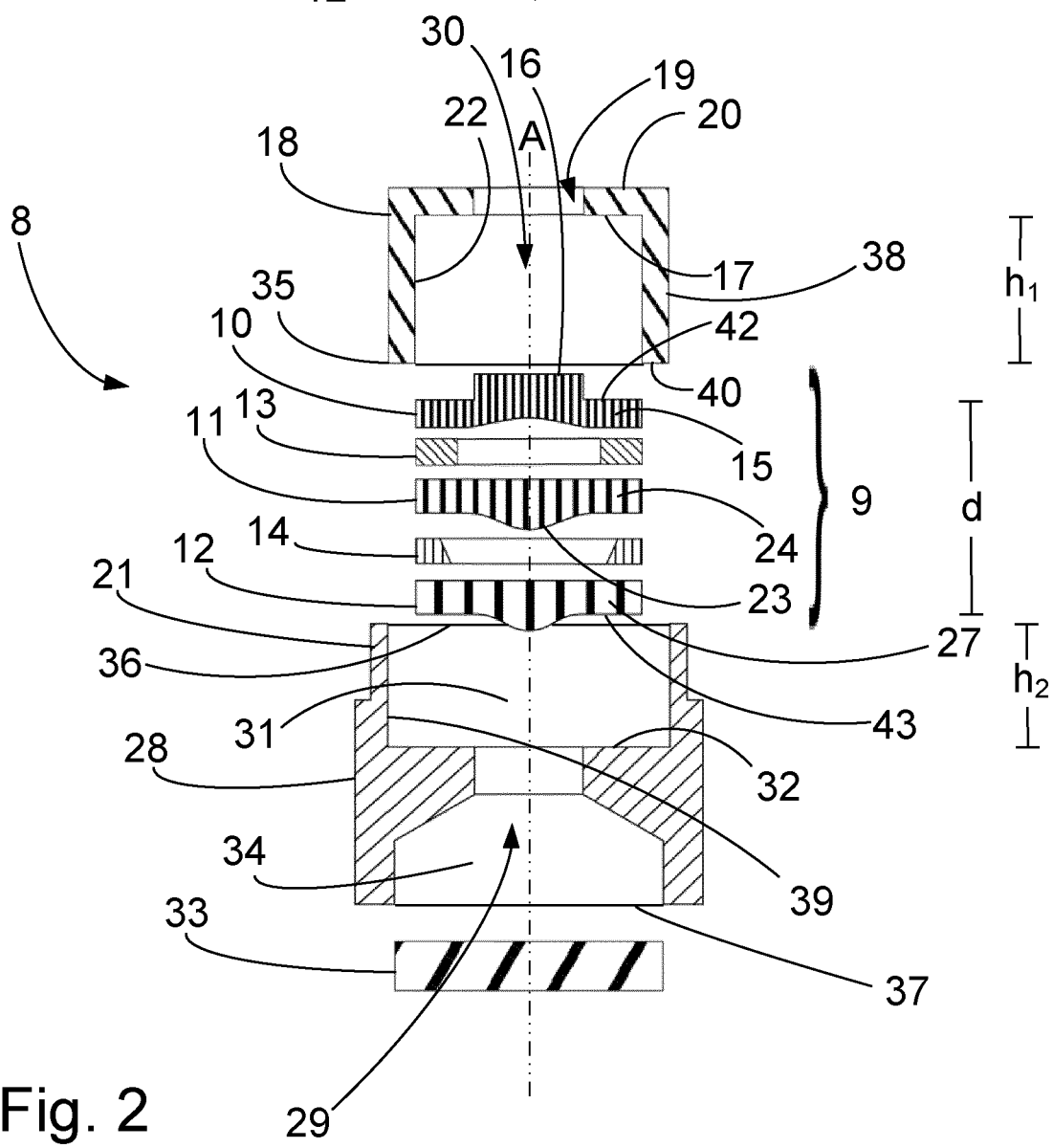
Figure 3:
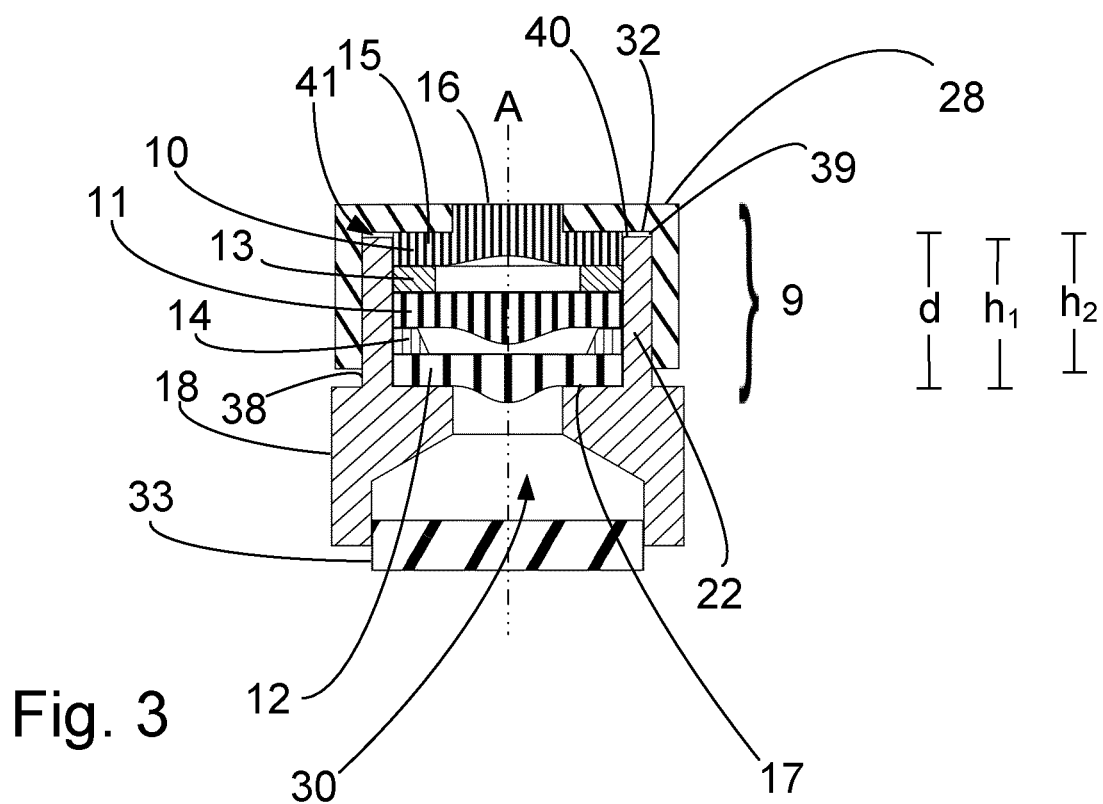
Figure 4:
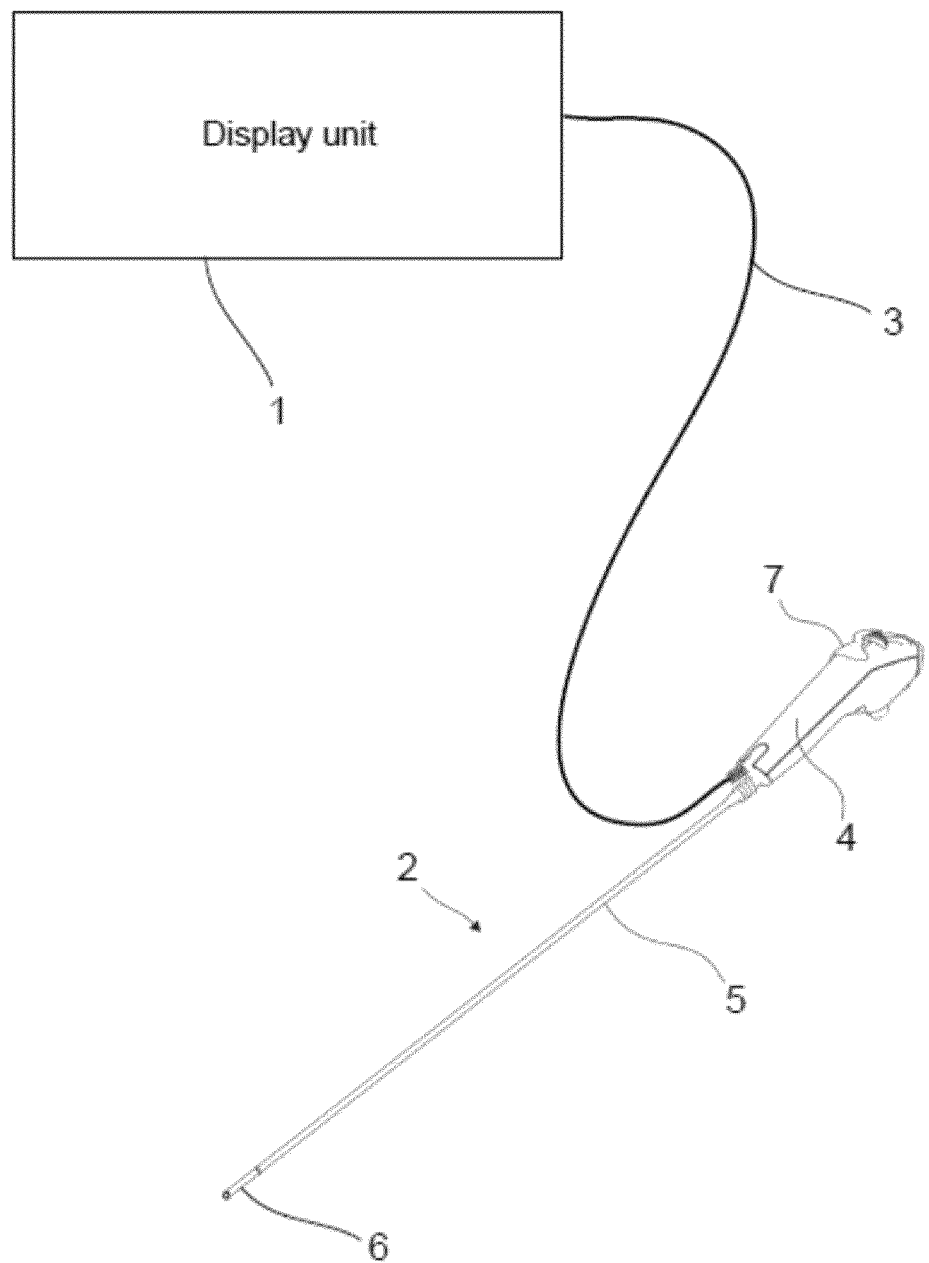

The disclosure will now be made in greater detail based non-limiting exemplary embodiments and with reference to the drawings, on which FIG. 1 schematically shows a cross-sectional view of an optical assembly of an endoscope according to the disclosure, FIG. 2 schematically shows an exploded cross-sectional view of the optical assembly of FIG. 1, FIG. 3 schematically shows a cross-sectional view of an optical assembly of an endoscope according to the disclosure, and FIG. 4 schematically shows a system incorporating a display unit and an endoscope according to the disclosure.

Turning first to FIG. 4, a system according to the first aspect of the disclosure is shown. The system comprises a display unit 1, such as a monitor with a screen, and an endoscope 2 connectable thereto via a wireless connection or a cable 3, as shown. The endoscope 2 is preferably a forward looking, disposable, i.e. single use, endoscope that is to be discarded after use in a patient, rather than cleaned, sterilized and reused. The endoscope 2 comprises a handle 4 at the proximal end adapted to be gripped by the hand of an operator, and a bendable insertion cord 5 extending towards the distal end of the endoscope 2 and adapted to be inserted into a patient. At the distal end of the insertion cord the endoscope comprises a tip part connected to the remainder of the insertion cord, i.e. a main tube part, via an articulated bending section 6. The articulated bending section 6 is highly bendable as compared to the main tube part. The bending motion of the bending section is controlled by the user using an operating member 7 such as knob or a lever via control cables (not visible) connected to the tip part or the distal end of the bending section 6. The bending section 6 comprises a thin covering sheath, and the inner details are thus not visible in FIG. 4.

The tip part comprises illumination means such as LEDs (not visible) in order to provide light for an optical image capturing system. The optical image capturing system comprises an optical assembly 8 as illustrated in cross-section in FIGS. 1, 2 and 3. FIG. 1 shows the assembled state of a first embodiment and FIG. 2 is an exploded view of the first embodiment for better identification of the various parts.

The optical assembly 8 comprises a lens stack 9. The lens stack 9 in the illustrated embodiment comprises three lenses arranged in an axial direction along a common central axis A, viz. a first lens 10, a second lens 11 and a third lens 12, separated by a first spacer 13 and a second spacer 14. One, more or preferably all of these lenses 10, 11, 12 are made of a plastic material, with suitable transparency, refractive index and other optical properties. Preferably the same transparent material would be used for all lenses 10, 11, 12. Other embodiments of the optical assembly 8 may have other numbers of lenses and consequently other numbers of spacers, in particular further lenses and more spacers, but evidently one less of each would also be possible. Such further lenses could preferably also be made of a plastic material, e.g. the same transparent material could be used those for lenses too. Lens 10 is the most distal lens of the optical assembly 8 when mounted in the tip of the forward-looking endoscope 2. As can be seen lens 10 comprises a plano concave lens part surrounded by an integral flange 15, which is preferably annular, i.e. surrounds the plano concave lens part entirely. In the first embodiment of the optical assembly 8, the plane surface 16 of the plano concave lens part faces exterior of the optical assembly 8. The surrounding flange 15 comprises an abutment surface 42 adapted to engage an inwardly extending ledge part 17 of the interior end surface of a first lens barrel part 18. The first lens barrel part 18 is essentially tubular and comprises a central passage 30 allowing light to pass the length thereof. The first lens barrel part 18 is preferably made of an opaque material blocking and/or absorbing undesired stray light. The opaque material may, in particular, be an opaque plastic material, allowing the first lens barrel part 18 to be manufactured by injection moulding. Preferably, in the assembled state the abutment surface 42 integral flange 15 of the lens 10 is pressed into contact with the ledge part 17 provided by the interior end surface of the first lens barrel part 18 in a sealing manner. However, it can be envisaged that the lens 10 is instead provided integrally with the first lens barrel part 18, e.g. by moulding both integrally in a two-stage two-component injection moulding process. This would further ensure alignment, as the lens 10 would then not be able to be inserted incorrectly, dislodge, or to be displaced with respect to the first lens barrel part 18 during assembly of the optical assembly 8. Also sealing of the essentially tubular first lens barrel part 18 at the distal end would be guaranteed. As can be seen the central lens part of the plano concave lens 10 is accommodated in an aperture 19 in the first lens barrel part 18. The aperture 19 is preferably circular and matches the diameter of the preferably also circular plano concave central lens part of the lens 10. The dimensions are preferably so that the plane surface 16 lies flush with the external end surface 20 of the first lens barrel part 18. This allows the plano concave lens 10 to provide a front window of the endoscope imaging system which, when in direct contact with the environment, is not prone to pick up contaminants, that might block or interfere with the vision. Evidently, other lens types for this lens as well as the other lenses to be described could be chosen, depending on the optical imaging properties desired.

Below the plano concave lens 10, in the stack in the orientation of the stack 9 illustrated in FIGS. 1 and 2, or in other words more proximal to the handle 4 of the endoscope 2, is a first spacer 13. The first spacer 13 is preferably an annular member with an outer diameter corresponding to the inner dimension of the first lens barrel part 18. A circumferential wall part 22 extends at a predetermined height $h_1$ from the ledge 17 (downwardly in the orientation shown in the figures). The circumferential wall part 22 of the first lens barrel 18 part is preferably cylindrical, at least over a majority of the length of the interior thereof, so as to form an outer circumferential surface adapted to guide and align the lens stack 9 once inserted during manufacture. The circumferential wall part 22, or at least the inner surface thereof is adapted in circumference to the lenses and spacers of the lens stack 9 so that they are surrounded in a manner supporting them. Accordingly, the inner dimension of the first lens barrel part 18 is a diameter and the first spacer 13 has a circular circumference. The central aperture of the first spacer 13 can have any suitable shape and dimension. The preferred shape, however, is circular, with a diameter suitable to fulfil the needs for depth of focus and amount of light captured. The first spacer 13 as illustrated has plane upper and lower surfaces ensuring a good abutment with the first lens 10 and a second lens 11 accommodated below it and spaced apart from the first lens by the first spacer 13. The distance between the two surfaces evidently also allows room for convexities of the lenses. The cross-section of the annular body of the first spacer 13 is preferably rectangular as illustrated, but suitable other shapes such as trapezes or ovals could be used instead.

The second lens 11 is in the illustrated embodiment plano convex, but could have any suitable shape giving the optical properties desired. Like the first lens 10 it comprises a central optically active part 23, i.e. refractive, and a circumferential flange part 24 for abutting the first spacer 13 and a second spacer 14. The second spacer 14 is preferably also an annular member with an outer circumference corresponding to the inner diameter of the cylindrical inner circumferential wall part 22 of the lens barrel 18. The central aperture of the second spacer 14 can have any suitable shape and dimension. Preferred however it is also circular, with a diameter suitable to fulfil the needs for depth of focus and amount of light captured. The second spacer as illustrated has also plane upper and lower surfaces ensuring a good abutment with the second lens 11 and a third lens 12 accommodated below it and spaced apart from the second lens 11 by the second spacer 14. The cross-section of the annular body of the second spacer 14 is preferably the shape of an asymmetric trapeze as illustrated, but suitable other shapes such as squares, rectangles or ovals could be used instead.

The third lens 12 comprises the lowermost lens in the lens stack in the illustrated orientation, or with respect to the endoscope 2 the most proximal to the handle 4. The third lens 12 is in the illustrated embodiment also plano convex, but could have any suitable shape giving the optical properties desired. Like the first and second lenses 10, 11, the third lens 12 comprises a central optically active part 26, i.e. refractive, and a circumferential flange part 27 for abutting the second spacer 14 and with an abutment surface 43 on the other side adapted for engaging a ledge part 32 a second lens barrel part 28.

As can be seen the second lens barrel part 28 also comprises a tubular member with an inner surface 39 defining a central passage 29 allowing light to pass the length thereof. Similar to the first lens barrel part 18, the second lends barrel part 28 may be made of an opaque material blocking and/or absorbing any undesired stray light. The opaque material is preferably an opaque plastic material, allowing also the second lens barrel part 28 to be manufactured by injection moulding.

The upper part of the second lens barrel part 28 comprises a second circumferential wall part 21 with an inner surface 39 as illustrated comprises a cylindrical bore section 31 adapted to the external dimensions of the outer surface 38 of the first lens barrel part 18, so that during assembly the first lens barrel part 18 may, at least partially, be inserted into the cylindrical bore section 31 towards the ledge part 32 extending inwardly into the central passage 29. The ledge part 32 may be an inwardly projecting circumferential rib, as shown, or may be a number of circumferentially spaced protrusions. The second circumferential wall part 21 has a height $h_2$ above the ledge 32. The dimensions are so selected that when the stack of lenses 10, 11, 12 and the spacers 13, 14 are pressed together between the first lens barrel part 18 and the second lends barrel part 28, the end face 40 of the first lens barrel part 18 does not abut the ledge part 32. Instead a gap 41 is left end face 40 and the ledge 32 to take up manufacturing tolerances and ensure that the lenses 10, 11, 12 and the spacers 13, 14 are properly aligned axially. By suitable selection of dimensions of the outer surface 38 and the inner surface 39, the inserted first lens barrel part 18 may be held firmly in place in the cylindrical bore section 31 of the second lens barrel part 28 by friction and the elastic forces between the two parts. Being both preferably made of plastic materials, this is much easier to achieve as compared to the ceramic materials used in JP2012002947 which in comparison to plastic materials are rigid, brittle and abrasive. Alternatively or additionally, an adhesive may be poured or migrate by capillary action into any gap between the outer surface 38 and the inner surface 39 to mutually secure them. Since this can be done from the exterior of the assembled parts, no risk of contaminating the lenses 10, 11, 12 by the adhesive and deteriorating the optical properties. To facilitate the insertion the outer rim 35 of at the end face 40 of the first lens barrel part 18 and/or the inner rim 36 of the second lens barrel part 28 may be chamfered. Apart from that their respective surfaces are preferably smooth in order to allow easy sliding insertion one into the other during assembly. This from a manufacturing perspective is much simpler than e.g. providing the surfaces of the parts with matching threads and screwing them together.

By proper selection of dimensions and materials, the elements of the lens stack 9 may be held in firm engagement with each other clamped between the interior end surface of the first lens barrel part 18 and the ledge part 32 of the second lens barrel part, thus ensuring their fixation in proper alignment along the axis A, both mutually and with the lens barrels parts 18, 28, providing the two-part housing of the optical assembly 8. That is to say, the axial length d between the abutment surface 42 at the distal end of the lens stack 9 and the abutment surface 43 at the proximal end is longer than the height $h_1$ of the circumferential wall part 22 above the respective ledge 17. It is also to say that the outer circumference of the lenses 10, 11, 12 and spacers 13, 14 match the inner circumference of the first lens barrel part 18.

Below the ledge 32 in the orientation of the optical assembly as illustrated in FIGS. 1 and 2, i.e. end most proximal to the handle of the forward-looking endoscope of FIG. 4, the central passage 29 may be adapted to accommodate an image sensor 33. This may be using a, preferably cylindrical, bore section 34 ensuring the alignment. Though not shown, such a bore section may comprise shoulders protrusions or ledges for the image sensor 33 to abut and rest on. The image sensor 33 may be held in place by means of adhesive og locking means may be incorporated in the bore section 34 of the inner surface 39. To facilitate the insertion into the bore section 34 the inner rim 37 may be chamfered.

Turning now to FIG. 3 a cross-section of an alternative embodiment of the optical assembly 8 is shown where the internal lens barrel part, i.e. the first lens barrel part 18 is proximal rather than distal and the second lens barrel part 28 is distal. Apart from this reversal, the clamping principle according to the disclosure remains the same. It will be understood that in this embodiment, the first lens barrel part 18 is adapted to receive the image sensor 33, and may in that respect exhibit the same features as the second lens barrel part 28 of the first embodiment.

In both embodiments the two lens barrel parts 18, 28 may be assembled by sliding the first lens barrel part 18 into the second lens barrel part 28, thereby clamping the lens stack 9 in the desired position and alignment. In this pressed-together state the whole optical assembly 8 may be held together by friction or, preferably, by an adhesive inserted remotely from the lenses 10, 11, 12, which are largely protected within the central bore of the first lens barrel part 18.

Once assembled and preferably tested, the optical assembly 8 may be mounted in the tip of the endoscope 2. In this respect, it should be noted that even though the above description has referred to a forward-looking endoscope 2, it is not excluded that endoscope in which the optical assembly is mounted is a sideways looking endoscope, e.g. a duodenoscope.

A detailed disclosure of preferred embodiments has now been made. It should be noticed that these embodiments constitute only currently preferred embodiments and that the skilled person will see numerous variants without deviating from the scope of the claims.

REFERENCE NUMERALS

1 Display unit
2 Endoscope
3 Cable
4 Handle
5 Insertion cord
6 Bending section
7 Operating member
8 Optical assembly
9 Lens stack
10 First lens
11 Second lens
12 Third lens
13 First spacer
14 Second spacer
15 Flange
16 Plane surface
17 Ledge part
18 First lens barrel part
19 Aperture
20 External end surface
21 Second circumferential wall part
22 First circumferential wall part
23 Optically active part
24 Flange part
26 Optically active part
27 Flange part
28 Second lens barrel part
29 Central passage
30 Central passage
31 Cylindrical bore section
32 Ledge part
33 Image sensor
34 Bore section
35 Outer rim
36 Inner rim
37 Inner rim
38 Outer surface
39 Inner surface
40 End face
41 Gap
42 Abutment surface
43 Abutment surface

The invention claimed is:

1. An endoscope comprising:
a handle; and
an insertion cord having a proximal end and a distal end, the proximal end connected to the handle, the insertion cord further including a tip part at the distal end;
the tip part including an optical assembly comprising a two-part lens barrel, an image sensor and a lens stack, the lens stack including lenses and spacers, the lenses and the spacers arranged in fixed relationships with each other in an axial direction to transmit an incident light onto the image sensor, the lens stack comprising a first abutment surface and a second abutment surface spaced apart from the first abutment surface in the axial direction, the two-part lens barrel including a first lens barrel part and a second lens barrel part,
wherein the first lens barrel part comprises a first circumferential wall having a distal ledge and an inner surface defining an inner passage, the lens stack positioned in the inner passage with the first abutment surface abutting an inner surface of the distal ledge, the first circumferential wall having a proximal surface,
wherein the second lens barrel part comprises a second circumferential wall having an inner ledge and an inner surface defining an inner passage, the second abutment surface of the lens stack abutting a distal surface of the inner ledge, the proximal surface of the first circumferential wall extending toward but not reaching a plane passing through the distal surface of the inner ledge, and
wherein the image sensor is supported at least partly by the second lens barrel part and positioned proximally of the inner passage.

2. The endoscope of claim 1, wherein the first lens barrel part and the second lens barrel part are secured to each other in mutual engagement.

3. The endoscope of claim 1, wherein the first lens barrel part and the second lens barrel part are secured to each other with an adhesive.

4. The endoscope of claim 1, wherein the lenses include a distal lens, and wherein the distal lens is formed in one-piece with the first lens barrel part.

5. The endoscope of claim 4, wherein distal lens and the first lens barrel part are integrally formed in a two-stage two-component injection moulding process.

6. The endoscope of claim 1, wherein the first circumferential wall extends into the inner passage of the second lens barrel part with an external surface of the first circumferential wall abutting the inner surface of the second circumferential wall, the proximal surface of the first circumferential wall not reaching the distal surface of the inner ledge.

7. The endoscope of claim 6, wherein the external surface is smooth and the inner surface of the second circumferential wall is smooth.

8. The endoscope of claim 1, wherein the second circumferential wall extends into the inner passage of the first lens barrel part with an external surface of the second circumferential wall abutting the inner surface of the first circumferential wall.

9. The endoscope of claim 8, wherein the second circumferential wall comprises a distal surface, the distal surface not abutting the proximal surface of the ledge of the first lens barrel part.

10. The endoscope of claim 1, wherein the first lens barrel part is made from a plastic material.

11. The endoscope of claim 10, wherein the plastic material is opaque.

12. The endoscope of claim 11, wherein the second lens barrel part is made from a plastic material.

13. The endoscope of claim 11, wherein the plastic material of the second lens barrel part is opaque.

14. The endoscope of claim 1, wherein the first lens barrel part and the second lens barrel part are made from opaque plastic materials, wherein the lenses are made from plastic materials.

15. The endoscope of claim 14, wherein the opaque plastic materials of the first lens barrel part and the second lens barrel part are the same.

16. The endoscope of claim 15, wherein plastic materials of each of the lenses are the same.

17. The endoscope of claim 1, wherein one, more than one, or all of the lenses are made from plastic materials.

18. A system comprising a display unit and the endoscope of claim 1.

19. The system of claim 18, wherein the first circumferential wall extends into the inner passage of the second lens barrel part with an external surface of the first circumferential wall abutting the inner surface of the second circumferential wall, the proximal surface of the first circumferential wall not reaching the distal surface of the inner ledge.

20. The system of claim 18, wherein the second circumferential wall extends into the inner passage of the first lens barrel part with an external surface of the second circumferential wall abutting the inner surface of the first circumferential wall.

21. An endoscope comprising:
a handle; and
an insertion cord having a proximal end and a distal end, the proximal end connected to the handle, the insertion cord further including a tip part at the distal end;
the tip part including an optical assembly comprising a two-part lens barrel, an image sensor and a lens stack, the lens stack including lenses and spacers, the lenses and the spacers arranged in fixed relationships with each other in an axial direction to transmit an incident light onto the image sensor, the lens stack comprising a first abutment surface and a second abutment surface spaced apart from the first abutment surface in the axial direction, the two-part lens barrel including a first lens barrel part and a second lens barrel part,
wherein the first lens barrel part comprises a first circumferential wall having a distal ledge and an inner surface defining an inner passage, the lens stack positioned in the inner passage with the first abutment surface abutting an inner surface of the distal ledge, the first circumferential wall having a proximal surface,
wherein the second lens barrel part comprises a second circumferential wall having an inner ledge and an inner surface defining an inner passage, the second abutment surface of the lens stack abutting a distal surface of the inner ledge, the proximal surface of the first circumferential wall extending toward but not reaching a plane passing through the distal surface of the inner ledge,
wherein the first circumferential wall extends into the inner passage of the second lens barrel part with an external surface of the first circumferential wall abutting the inner surface of the second circumferential wall, the proximal surface of the first circumferential wall facing but not reaching the distal surface of the inner ledge, and
wherein the image sensor is supported at least partly by the second lens barrel part and positioned proximally of the inner passage.

22. The endoscope of claim 21, wherein the first lens barrel part and the second lens barrel part are secured to each other with an adhesive.

23. The endoscope of claim 21, wherein the lenses include a distal lens, and wherein the distal lens is formed in one-piece with the first lens barrel part.

* * * * *